May 16, 1933.    W. F. SMITH    1,909,230
MOUNTING STRUCTURE FOR ANTIFRICTION BEARINGS
Filed Dec. 7, 1931
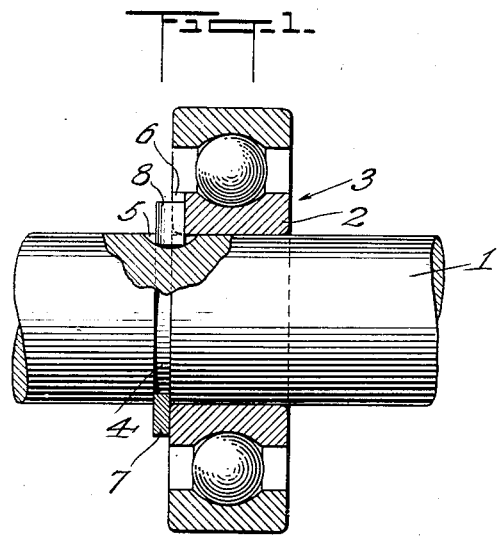
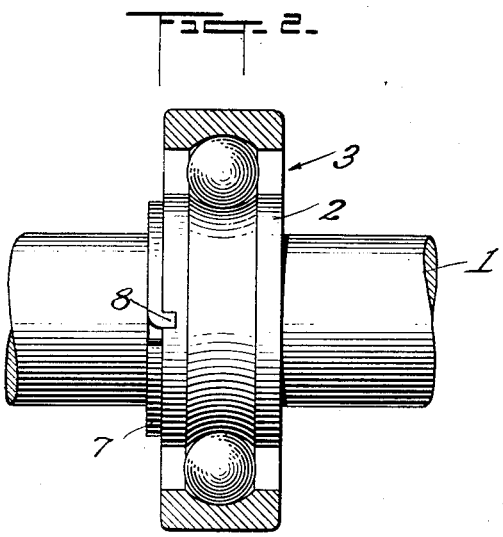
INVENTOR
W. F. Smith
BY
ATTORNEY Patented May 16, 1933

1,909,230

UNITED STATES PATENT OFFICE

WILLIAM F. SMITH, OF POUGHKEEPSIE, NEW YORK, ASSIGNOR TO THE FEDERAL BEARINGS CO., INC., OF POUGHKEEPSIE, NEW YORK, A CORPORATION OF NEW YORK

MOUNTING STRUCTURE FOR ANTIFRICTION BEARINGS

Application filed December 7, 1931. Serial No. 579,385.

This invention relates to new and useful improvements in mounting structures for anti-friction bearings.

It is the object of the present invention to provide an arrangement whereby anti-friction bearings and the like may be guarded against displacement on shafts by means of a simple snap ring.

I have illustrated an embodiment of the invention, Fig. 1 being a vertical cross-section and Fig. 2 a side elevation.

1 is a shaft fitting within the shaft receiving bore of the inner ring 2 of an anti-friction bearing 3. Adjacent to the mounting point of the bearing a circular groove 4 is cut in the shaft. The side wall of the groove 4 is in alignment with the edge of the inner ring 2, except at one point where a lateral cut 5 in the shaft 1 extends the groove within the bore. There is a notch 6 in the side of inner ring 2 in alignment with the lateral cut 5. The snap ring 7 fits within the groove 4 and has an end 8, which is bent so that it engages with the lateral cut 5 and the notch 6 in the inner ring. Thus, by means of the end 8 of the snap ring, relative displacements of shaft 1 and the inner ring 2 are prevented whether the shaft has a tendency to rotate in one direction or the other.

The standard anti-friction bearings can be used and all that is necessary is to mill a notch in the side of the inner ring. This will not materially weaken the bearing. The milling of a groove like 4 is permissible even where splined shafts are used.

What is claimed is:

In combination, an anti-friction bearing having an inner ring, said ring having a shaft receiving bore and a notch cut in its side, a shaft grooved adjacent the mounting point of said bearing, said groove having a lateral cut extending within the bore of the inner ring below its notch, and a snap ring in said groove and having an end bent to lie in said lateral cut and said notch.

In testimony whereof: I have signed my name to this specification this 4 day of December, 1931.

WILLIAM F. SMITH.